United States Patent
Richards

(10) Patent No.: US 10,996,514 B1
(45) Date of Patent: May 4, 2021

(54) OFFSETTING NON-UNIFORM BRIGHTNESS USING A BACKLIGHT ASSEMBLY

(71) Applicant: Facebook Technologies, LLC, Menlo Park, CA (US)

(72) Inventor: Evan M. Richards, Santa Clara, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 205 days.

(21) Appl. No.: 16/258,184

(22) Filed: Jan. 25, 2019

(51) Int. Cl.
*G02F 1/13357* (2006.01)
*G02B 27/00* (2006.01)
*G02F 1/1335* (2006.01)

(52) U.S. Cl.
CPC .. *G02F 1/133611* (2013.01); *G02F 1/133603* (2013.01); *G02F 1/133606* (2013.01); *G02B 27/0093* (2013.01); *G02F 1/133607* (2021.01)

(58) Field of Classification Search
CPC ......... G02F 1/133611; G02F 1/133603; G02F 1/133606; G02F 2001/133607; G02B 27/0093; G02B 6/0036; G02B 27/017; G02B 27/0172
USPC ....................................................... 359/630
See application file for complete search history.

(56) References Cited

U.S. PATENT DOCUMENTS

| 10,572,731 | B1 * | 2/2020 | Ouderkirk | ................ H04N 5/33 |
| 2008/0151576 | A1 * | 6/2008 | Inditsky | ............... G02B 6/0021 |
| | | | | 362/615 |
| 2020/0200962 | A1 * | 6/2020 | Chen | .................. G02B 27/0172 |
| 2020/0262351 | A1 * | 8/2020 | Toyooka | ........... G02F 1/133536 |
| 2020/0329292 | A1 * | 10/2020 | Osterhout | ............. G06F 1/1688 |

* cited by examiner

*Primary Examiner* — Kristina M Deherrera
(74) *Attorney, Agent, or Firm* — Fenwick & West LLP

(57) ABSTRACT

A headset includes a backlight assembly, a display panel, and an optics block. The backlight assembly includes an array of light emitting diodes (LEDs), a diffusing element, and a brightness enhancement film. The array of LEDs and the brightness enhancement film are configured in a way such that the light generated by the backlight assembly has a non-uniform brightness distribution. The display panel receives the light and convert the light to image light. The image light has at least the non-uniform brightness distribution. The optics block includes one or more optical elements that direct the image light to an eyebox of the headset. The optics block adds another non-uniform brightness distribution to the image light to offset the non-uniform brightness distribution from the backlight assembly, such that the image light directed to the eyebox has a target brightness distribution.

20 Claims, 9 Drawing Sheets

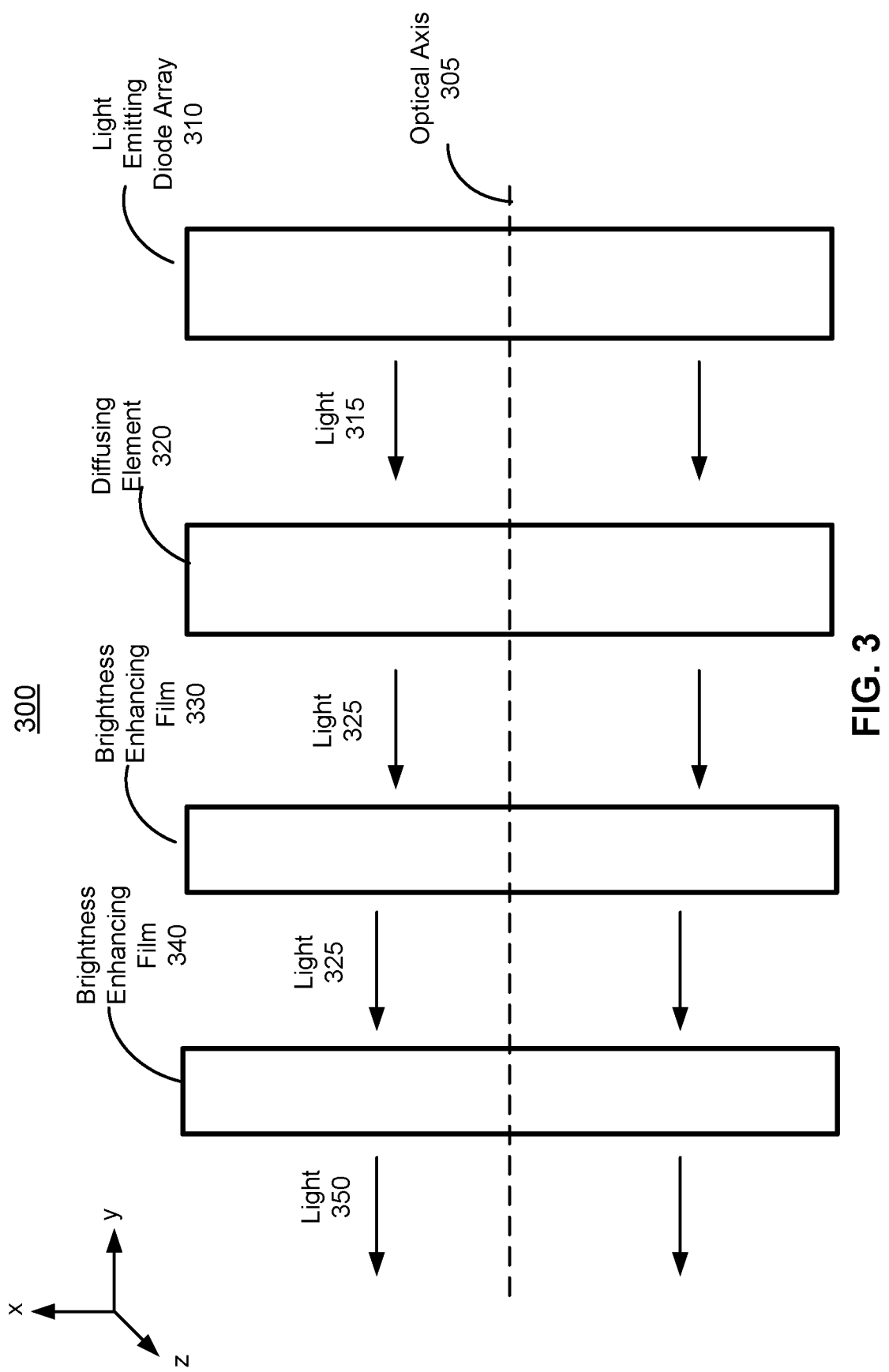

OFFSETTING NON-UNIFORM BRIGHTNESS USING A BACKLIGHT ASSEMBLY

BACKGROUND

This disclosure relates generally to backlit displays, and specifically to offsetting non-uniform brightness using a backlight assembly.

Some conventional head-mounted displays (HMDs) include components in the optical path of a display of the HMD that can result in non-uniform brightness of a displayed image. For example, in a backlit display having an optical assembly or a LCD display panel, the brightness of the output light highly depends on viewing angle. Usually there is a significant drop in brightness if the user views from the side of the display. The non-uniform brightness degrades image quality and can adversely affect a user's use of the HMD.

SUMMARY

A backlit display system operates in a headset to present images to a user. The backlit display system includes a backlight assembly, a display panel, and an optics block. The backlight assembly generates light that is used to backlight the display panel. The display panel receives the light and converts it to image light. The optics block magnifies the image light and directs the magnified image light to an eyebox where an eye of the user is located. The display panel and the optics block can cause errors in brightness distribution of the image light, which can result in poor image quality. For example, due to pixel structure of the display panel and/or optical design of the optics block, brightness of the image light significantly varies with viewing angle of the user. The user can see bright image when looking forward but see much darker image when looking from an angle.

In some embodiments, the errors caused by the display panel and/or the optics block are corrected by the light generated by the backlight assembly. The backlight assembly includes an array of light emitting diodes (LEDs) and at least one brightness enhancement film. The LEDs and/or the brightness enhancement film are configured to produce light that has a non-uniform brightness distribution, and backlight the display panel using the light. The non-uniform brightness distribution of the light can offset errors in the brightness distribution of the image light caused by the optics block and/or the display panel. As a result, the image light directed to the eyebox has a target brightness distribution. In one embodiment, the target brightness distribution is substantially similar to the Lambertian brightness distribution. In another embodiment, the target brightness distribution has minor variation as the user's viewing angle changes.

The non-uniform brightness distribution in the light generated by the backlight assembly may be based on, e.g., different levels of brightness of the light emitted by at least some of the LEDs in the backlight assembly, orientations of the LEDs in the backlight assembly, configurations of the at least one brightness enhancement film, or some combination thereof.

BRIEF DESCRIPTION OF THE DRAWINGS

FIG. 3 is a diagram showing a backlight assembly, in accordance with one or more embodiments.

Figure 1:
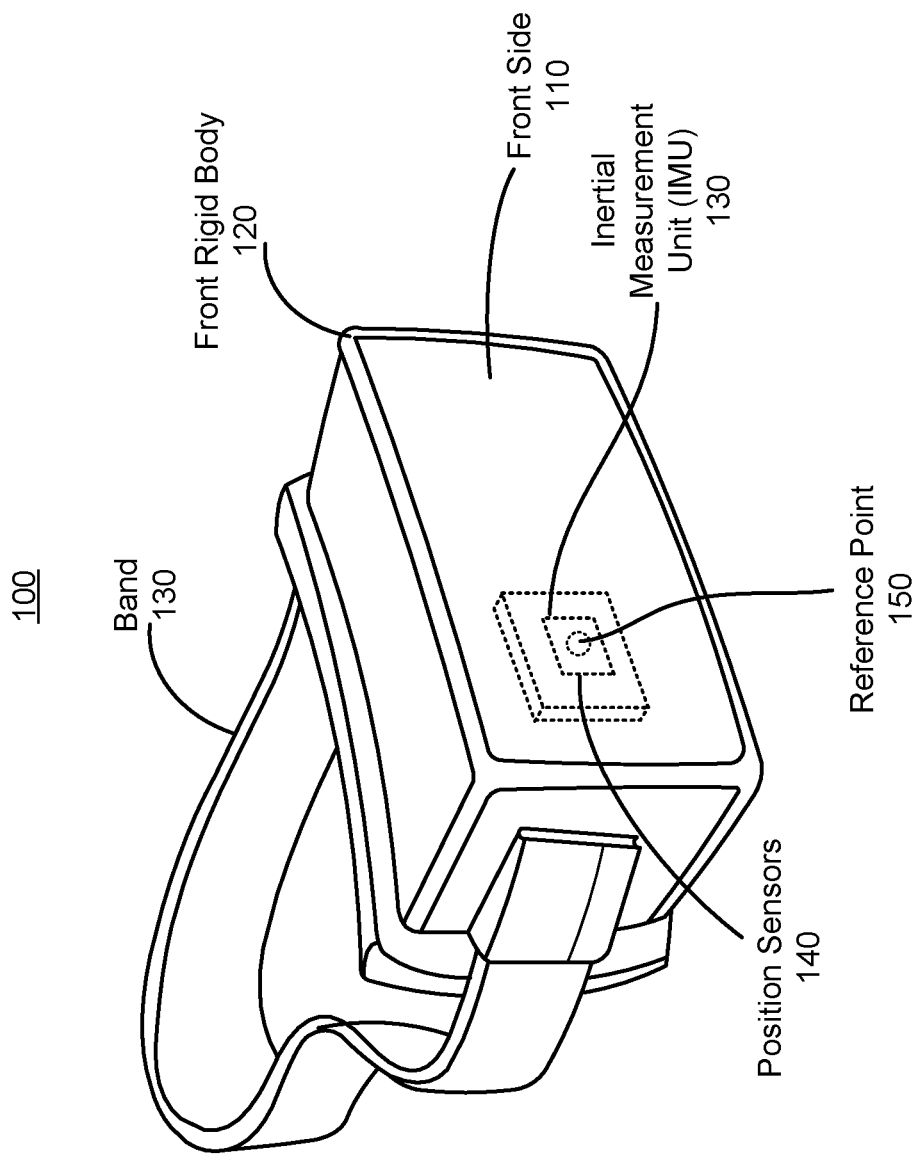
FIG. 1 is a diagram of a headset, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A headset display system for displaying images includes a backlight assembly, a display panel, and an optics block. The backlight assembly generates light that includes a first non-uniform brightness distribution. In some embodiments, the backlight assembly includes an array of LEDs, a diffusing element, and a brightness enhancement film. The LEDs emit light. The diffusing element scatters the light emitted by the LEDs and transmits the light to the brightness enhancement film. The brightness enhancement film includes a plurality of prisms configured to diffuse and the light which is used to backlight the display panel. The non-uniform brightness distribution of the light generated by the backlight assembly can be based on one or more of the following: different levels of brightness of at least some of the LEDs, different orientations of at least some of the LEDs, and different orientations of at least some of the prisms of the brightness enhancement film. The display panel and/or the optics block introduces a second non-uniform brightness distribution to the light. The backlight assembly is configured such that that the first non-uniform brightness pattern offsets the second non-uniform brightness pattern, thereby resulting in a target brightness distribution at an eyebox of the headset.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset or head-mounted display (HMD) connected to a host computer system, a standalone NED, a mobile device or computing system, or any other hardware platform capable of providing artificial reality content to one or more viewer.

Headset

FIG. 1 is a diagram of a headset 100, in accordance with one or more embodiments. In the illustrated embodiments, the headset 100 is a HMD. In alternate embodiments (not shown), the headset 100 may be part of a near-eye display (e.g., can have a form factor similar to a pair of eye-glasses). The headset 100 may be part of an artificial reality system. In embodiments that describe AR system and/or a MR system, portions of a front side 110 of the headset 100 are at least partially transparent in the visible band (~380 nm to 750 nm), and portions of the headset 100 that are between the front side 110 of the headset 100 and an eye of the user are at least partially transparent (e.g., a partially transparent electronic display).

The headset 100 provides content (e.g., virtual, augmented, etc.) to a wearer. The headset 100 includes a front rigid body 120 and a band 130. The front rigid body 120 includes a backlit display system (not shown), an Inertial Measurement Unit (IMU) 130, one or more position sensors 140, and the reference point 150. In some embodiments, the front rigid body 120 also includes an eye tracking system.

The backlit display system is configured to present content, such as 2D and 3D images, to the user. As described below in detail, the backlit display system includes a backlight assembly, a display panel, and an optics block. The backlight assembly generates light that includes a first non-uniform brightness distribution. The display panel receives the light and converts it to image light. The image light includes the first non-uniform brightness distribution. The optics block magnifies the image light and directs the magnified image light to an eyebox for each eye of a wearer. The display panel, the optics block, some component within the path of the image light, or some combination thereof, can add a second non-uniform brightness distribution to the image light. In some embodiments, the image light received by the eyebox has a target brightness distribution that is either substantially similar to the Lambertian brightness distribution or otherwise has minor variation as the user's viewing angle changes.

The IMU 130 is an electronic device that generates IMU data based on measurement signals received from one or more of the position sensors 140. The reference point 150 is a point that may be used to describe the position of the headset 100. A position sensor 140 generates one or more measurement signals in response to motion of the headset 100. Examples of position sensors 140 include: one or more accelerometers, one or more gyroscopes, one or more magnetometers, another suitable type of sensor that detects motion, a type of sensor used for error correction of the IMU 130, or some combination thereof. In the embodiment shown by FIG. 1, the position sensors 140 are located within the IMU 130, and neither the IMU 130 nor the position sensors 140 are visible to a user of the headset 100. The position sensors 140 may be located external to the IMU 130, internal to the IMU 130, or some combination thereof.

Based on the one or more measurement signals from one or more position sensors 150, the IMU 130 generates IMU data indicating an estimated position of the headset 100 relative to an initial position of the headset 100. For example, the position sensors 140 include multiple accelerometers to measure translational motion (forward/back, up/down, left/right) and multiple gyroscopes to measure rotational motion (e.g., pitch, yaw, or roll). In some embodiments, the IMU 130 rapidly samples the measurement signals and calculates the estimated position of the headset 100 from the sampled data. For example, the IMU 130 integrates the measurement signals received from the accelerometers over time to estimate a velocity vector and integrates the velocity vector over time to determine an estimated position of a reference point on the headset 100. The reference point 150 is a point that may be used to describe the position of the headset 100. While the reference point may generally be defined as a point in space; however, in practice the reference point is defined as a point within the headset 100 (e.g., a center of the IMU 130).

Figure 2:
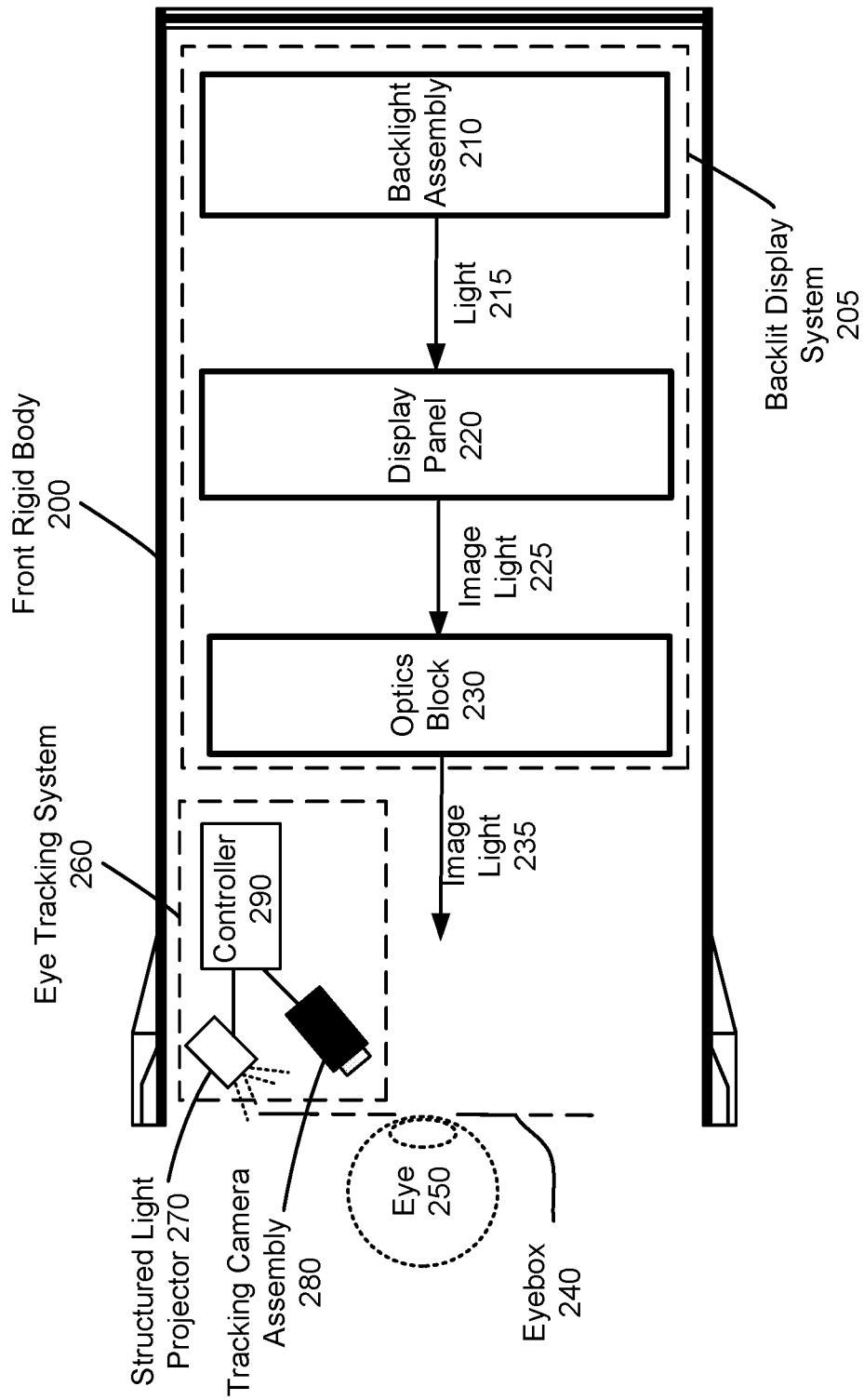
FIG. 2 is a cross-section of a front rigid body of a headset, in accordance with one or more embodiments.

FIG. 2 is a cross-section of a front rigid body 200 of a headset, in accordance with one or more embodiments. The front rigid body 200 can be an embodiment of the front rigid body 120 in FIG. 1. As shown in FIG. 2, the front rigid body 200 includes a backlit display system 205 and an eye tracking system 260. Some embodiments of the front rigid body 200 can have different components than those described here. Similarly, the functions can be distributed among the components in a different manner than is described here.

The backlit display system 205 provides image light 235 to an eyebox 240. The eyebox 240 is the location where a user's eye 250 is positioned while wearing the headset 100. In some embodiments, the image light 235 has a brightness that is substantially uniform (e.g., less than 1% change) irrespective of gaze angle of the eye 250. The backlit display system 205 includes a backlight assembly 210, a display panel 220, and an optics block 230.

The backlight assembly 210 generates light 215, which backlights the display panel 220. The backlight assembly 210 is configured so that the light 215 includes a first non-uniform brightness distribution. In some embodiments, the backlight assembly 210 includes an LED array that includes a plurality of LEDs and a brightness enhancement film that includes a plurality of prisms. The first non-uniform brightness distribution in the light 215 can be caused by one or more of the following: different levels of brightness of the light emitted by at least some of the LEDs, different orientations of at least some of the LEDs, and different orientations of at least some of the prisms of the brightness enhancement film.

The display panel 220 converts the light 215 to image light 225. In some embodiments, the display panel is a liquid crystal display (LCD) panel. Due to the pixel structure of the LCD panel, the display panel 220 can cause spatial variation in brightness of the image light 225. For example, image light 225 created in a central region of the display panel 220 is brighter than image light 225 created in a peripherical region of the display panel 220.

The optics block 230 directs image light 235 to the eyebox 240. The optics block 230 includes one or more optical elements. An optical element may be an aperture, a Fresnel lens, a refractive lens, a reflective surface, a waveplate (e.g., quarter wave plate), a diffractive element, a waveguide, a reflector (full reflector or a partial reflector), a filter, or any other suitable optical element that affects the image light from the display panel 220. Moreover, the optics block 230 may include combinations of different optical elements. In some embodiments, one or more of the optical elements in the optics block 230 may have one or more coatings, such as anti-reflective coatings, dichroic coatings, etc. In some embodiments, there are a plurality of optical elements, including at least a first optical element and a second optical element, that together form a folded optical system (i.e., the light is reflected back towards the display panel 220 at least once before exiting the optics block 230). In some embodiments, a pancake lens assembly is an example, of a folded optical system. Additional details of a pancake lens assembly may be found at, e.g., U.S. patent application Ser. Nos. 15/441,738, 15/335,807, and 15/179,883 which are hereby incorporated by reference in their entirety.

In some embodiments, the optics block 230 magnifies the image light 225. Magnification of the image light by the optics block 230 allows elements of the display panel 220 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases, all of the user's field-of-view. The optics block 230 can also correct optical aberrations associated with the image light 225.

The optics block 230 can cause spatial and/or angular variation in brightness of the image light 235. The brightness contribution of the image light 235 is a combination of the first non-uniform brightness distribution in the light 215 and a second non-uniform brightness distribution caused by the display panel 220 and the optics block 230. The first non-uniform brightness distribution is offset by the second non-uniform brightness distribution so that the brightness distribution of the image light 235 has minor spatial variation.

The eye tracking system 260 is configured to determine eye tracking information for the eye 250. The determined eye tracking information may comprise information about an orientation of the eye 250 in the eyebox 250, e.g., information about an angle of an eye-gaze. In the embodiment of FIG. 2, the eye tracking system 260 uses structured light to determine depth information of the eye 250. The eye tracking system 260 includes a structured light projector 270, a tracking camera assembly 280, and a controller 290 that may be coupled to both the structured light projector 270 and the tracking camera assembly 280. In other embodiments, the eye tracking system 260 can use other methods to determine depth information of the eye 250, such as time of flight of flashes, stereotype images captured by multiple cameras, or detection of glints.

The structured light projector 270 projects structured light into the eyebox 240 in accordance with instructions generated by the controller 250. The structured light projector 270 includes an illuminator, a diffractive optical element (DOE), and a projection assembly. The illuminator may include a plurality of emitters that each can emit light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. The DOE converts light from the illuminator into structured light. The structured light may include, e.g., a dot matrix pattern, a single line pattern, a sinusoid pattern, a multi (spatial) tone pattern, and a grid pattern, diffuse light (e.g., for time of flight depth determination), some other light that can be used to determine depth information, or some combination thereof. A DOE may be, e.g., one or more diffraction gratings, a diffuser, a spatial light modulator, some other element that forms structured light, or some combination thereof. In some embodiments, structured light is not generated by a DOE but is formed by interference of two or more beams of pulses of light, such as time-shared scanning beams or Gaussian beams. The projection assembly includes one or more optical elements (e.g., lens, polarizer, etc.) that collect the structured light and project the structured light onto the eye 250 in the eyebox 240.

The tracking camera assembly 280 includes one or more cameras configured to capture portions of the structured light 255 reflected from the eye 250. In some embodiments, the tracking camera assembly 280 includes a detector that detects structured light pattern in a field of view of the tracking camera assembly 280. The detector comprises an array of photodiodes. A photodiode is sensitive to light and converts collected photons to photoelectrons. The tracking camera assembly 280 reads out the photoelectrons to obtain image data. During the readout, the tracking camera assembly 280 can convert the photoelectrons into digital signals (i.e., analog-to-digital conversion).

The controller 290 controls the structured light projector 270 and the tracking camera assembly 280. The controller 290 also determines depth information using image data generated by the tracking camera assembly 280. In some embodiments, the controller 290 is configured to determine depth information of the eye 250 based on phase-shifted patterns of the portions of the reflected structured light distorted by shapes of the eye 250, and to use triangulation calculation to obtain a depth map of the eye 250. The controller 290 generates tracking information of the eye 250 based on the depth information. Tracking information includes, e.g., movement information, position and orientation, gaze direction (e.g., where a user is looking), vergence, etc.

In some embodiments, the controller 290 provides the generated tracking information to a console (not shown in FIG. 2). The console and/or the headset 100 may utilize the tracking information (e.g., gaze direction) to dynamically adjust configuration of the backlight assembly 210 so that the first non-uniform brightness distribution of the light 215 is determined based on the gaze direction. The console and/or the headset 100 may also utilize the tracking information to generate content for presentation by the backlit display system 205. The backlit display system 205 can provide image light based on the tracking information. For example, the front rigid body 120 further comprises a varifocal module (not shown in FIG. 2). The varifocal module may adjust focus of one or more images displayed on the electronic display 220, based on the eye tracking information. In one embodiment, the varifocal module adjusts focus of the displayed images and mitigates vergence-accommodation conflict by adjusting a focal distance of the optical block 230 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 216 to generate content for presentation on the electronic display 220.

For purposes of illustration, FIG. 2 shows a cross section of the front rigid body 120 associated with a single eye 250, but another backlit display system 205, separate from the backlit display system 205, may provide image light to another eye of the user. Also, another eye tracking system 260 may determine tracking information of the other eye of the user. In some embodiments, a single backlit display system 205 may provide image light to both eyes of the user and a single eye tracking system 260 may track both eyes.

FIG. 3 is a diagram showing a backlight assembly 300, in accordance with one or more embodiments. The backlight assembly 300 is an embodiment of the backlight assembly 210. The backlight assembly 300 generates light 350 to backlight a display panel, e.g., the display panel 220 in FIG. 2. The light 350 includes a non-uniform brightness distribution. In the embodiment of FIG. 3, the backlight assembly 300 includes a LED array 310, two brightness enhancement films 330 and 340, and a diffusing element 320. Some embodiments of the backlight assembly 205 can have different components than those described here. Similarly, the functions can be distributed among the components in a different manner than is described here. For example, the backlight assembly 205 can include one brightness enhancement film.

The LED array 310 emits light 315. The LED array 310 includes a plurality of LEDs. At least some of the LEDs may emit light of different levels of brightness. Additionally or alternatively, at least some of the LEDs have different orientations. LEDs having different orientations emit light in different directions. For instance, some of the LEDs emit light in a direction parallel to an optical axis 305, versus some other LEDs emit light in directions not parallel to an optical axis 305. Angles between the directions of the emitted light and the optical axis are bias angles of these other LEDs. In some embodiments, the bias angle of an LED depends on the location of the LED in the LED array 310. For example, an LED located further from the interaction of the LED array 310 and optical axis 305 has a larger bias angle. As another example, LEDs in a central region of the LED array 310 have no bias angle but LEDs in a peripherical region that circumscribes the central region have a bias angle. The optical axis 305 can be an axis of the display panel. In some embodiments, different regions of the LED array 310 have different LED densities. For example, a peripheral region has more LEDs than a center region that has a same size as the peripheral region. The different levels of brightness of the emitted light, different orientations of LEDs, and/or different densities of LEDs result in non-uniform brightness distribution in the light 315.

The diffusing element 320 diffuses the light 315. In some embodiments, the diffusing element 320 includes a series of unevenly space bumps configured to spread the light 315 to light 325.

The brightness enhancement films 330 and 340 recycle otherwise wasted light 325 to enhance brightness of the light 215. The brightness enhancement films 330 and 340 each include a plurality of prisms. The prisms can guide the otherwise wasted spread light 325 back towards the display panel 220. The prisms of a brightness enhancement film 330 or 340 are arranged so that the brightness enhancement film 330 or 340 affects brightness distribution of the light 325 or light 335 substantially along a particular direction, e.g., a direction parallel to the optical axis 305. The particular direction is the orientation of the brightness enhancement film 330 or 340. In some embodiments, the brightness enhancement film 330 has an orientation along x axis while the brightness enhancement film 340 has an orientation along y axis, which is orthogonal to the orientation of the brightness enhancement film 330. In other embodiments, the backlight assembly 300 includes one brightness enhancement film having more than one orientations. For example, the brightness enhancement film can have an orientation along the x axis and another orientation along the y axis.

In some embodiments, at least some of the prisms of one or both of the brightness enhancement films 330 and 340 have different orientations. For instances, some of the prisms have an orientation parallel to the optical axis 305 but some other prisms have different orientations. Angles between the orientation of a prism and the optical axis is the bias angle of the prism. In some embodiments, the bias angle of a prism depends on the location of the prism in the brightness enhancement film 330 or 340. For example, a prism located further from the interaction of the LED array 310 and optical axis 305 has a larger bias angle. As another example, prisms in a central region of the brightness enhancement film 330 or 340 have no bias angle but brightness enhancement film 330 or 340 in a peripherical region that circumscribes the central region have a bias angle. Prisms of different bias angles reflect light differently and therefore recycles different amounts of light, causing variation in brightness of the light 350.

Figure 4A:
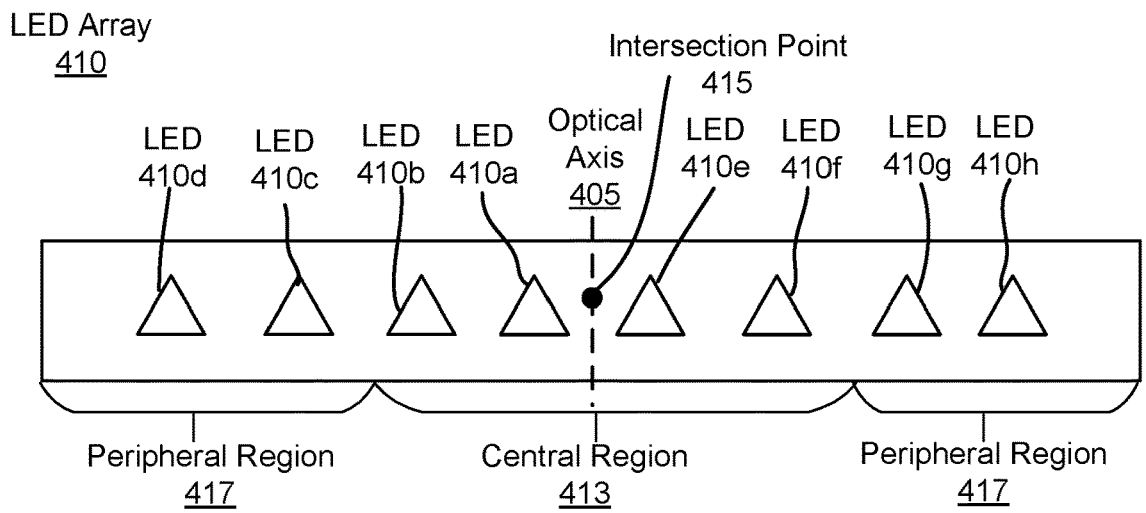
FIG. 4A shows an array of LEDs, in which at least some of the LEDs emit light of different levels of brightness, in accordance with one or more embodiments.

FIG. 4A shows an array 410 of LEDs 410a-h, in which at least some of the LEDs 410a-h emit light of different levels of brightness, in accordance with one or more embodiments. The LEDs 410a-h have a same orientation. They all emit light in a direction parallel to the optical axis 405. But some of the LEDs 410a-h are configured to emit light of different levels of brightness. The different levels of brightness are based in part on locations of LEDs 410a-h with respective to an on-axis intersection point 415 where the optical axis 405 intersects with the LED array 410. For example, the LED 410d is furthest from the intersection point 415 emits brighter light than the LED 410a, which is the closest to the intersection point 415. In some embodiments, LEDs of locations having the same distance from the interaction point 415 emit light of the same level of brightness. For example, the LEDs 410a and 410e emit light having the same level of brightness, the LEDs 410b and 410f emit light having the same level of brightness, the LEDs 410c and 410g emit light having the same level of brightness, and the LEDs 410d and 410h emit light having the same level of brightness. In one embodiment, the brightness of the LEDs 410a-h increases as their distance from the interaction point 415 increases. In another embodiment, the LED array 410 includes a central region 413 and a peripheral region 417. The central region 413 is circumscribed by the peripheral region 417. 410c-d and 410 f-h) and includes regions from the boundaries of the central region to the edges of the array 410. In one example, the LEDs 410a and 410e are located in the central region 413, and the LEDs 410c-d and 410 f-h are located in the peripheral region 417. The LEDs 410c-d and 410f-h emit brighter light than the LEDs 410a and 410e. Since the LEDs 410 at different locations emit light having different levels of brightness, light emitted by the array 410 has a non-uniform distribution.

The different levels of brightness of the LEDs can be determined based on gaze angles of the eye 250. In some embodiments, a controller associated with the backlight assembly 210 determines a gaze angle of the eye 250 and adjusts brightness of some or all of the LEDs 410-480 based on the determined gaze angle. For example, the controller estimates, based on content presented by the backlit display system 205 and/or habit of the user, that the user is likely to gaze at a particular direction. In some other embodiments, the eye tracking system 260 detects a gaze angle of the user, as discussed above in conjunction with FIG. 2. The controller adjusts brightness of some or all of the LEDs 410-480 based on the detected gaze angle. The determination of the gaze angle and adjustment of the brightness of the LEDs 410-480 can be continuous and dynamic.

Figure 4B:
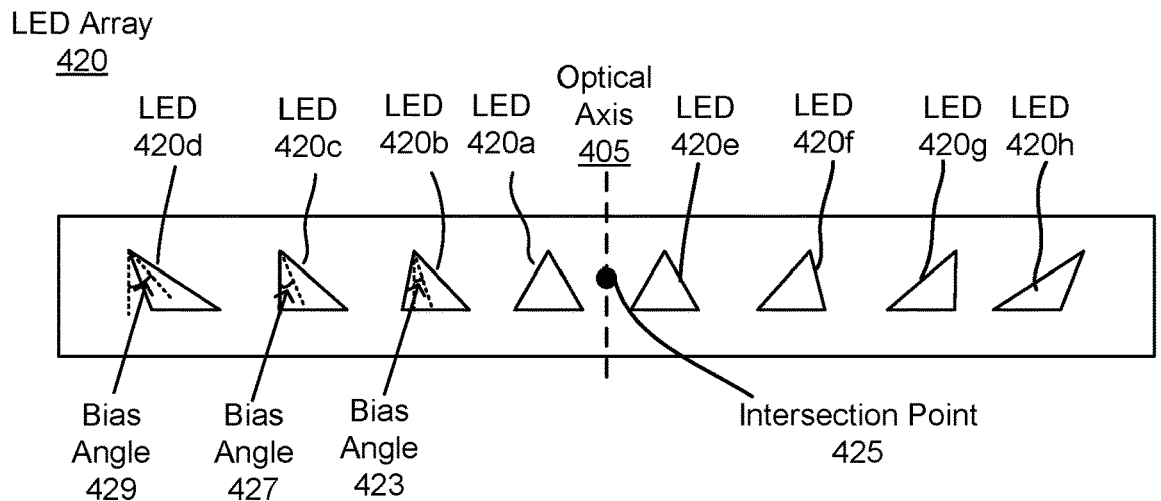
FIG. 4B shows an array of LEDs, in which at least some of the LEDs have different orientations, in accordance with one or more embodiments.

FIG. 4B shows an array 420 of LEDs 420a-h, in which at least some of the LEDs 420a-h have different orientations, in accordance with one or more embodiments. Each LED 410 has an orientation along a respective bias angle. The bias angle is an angle between the direction of light emitted by the corresponding LED 420 and a direction parallel to the optical axis 405. In the embodiment of FIG. 4B, the bias angles of the LEDs 420a-h increase with their distance from the intersection point 425. In some embodiments, LEDs 420 of locations having the same distance from the interaction point 425 have the same bias angle. As shown in FIG. 4B, the bias angles of the LEDs 420a and 420e are both zero. The LEDs 420c and 420g have the same bias angle 427, which is larger than the bias angle 423 of the LEDs 420b and 420f but smaller than the bias angle 429 of the LEDs 420d and 420h. Due to the different orientations of some of the LEDs 420a-h, light emitted by the array 420 has a non-uniform distribution. Also, at least some of the LEDs 420a-h may emit light having different levels of brightness.

Figure 4C:
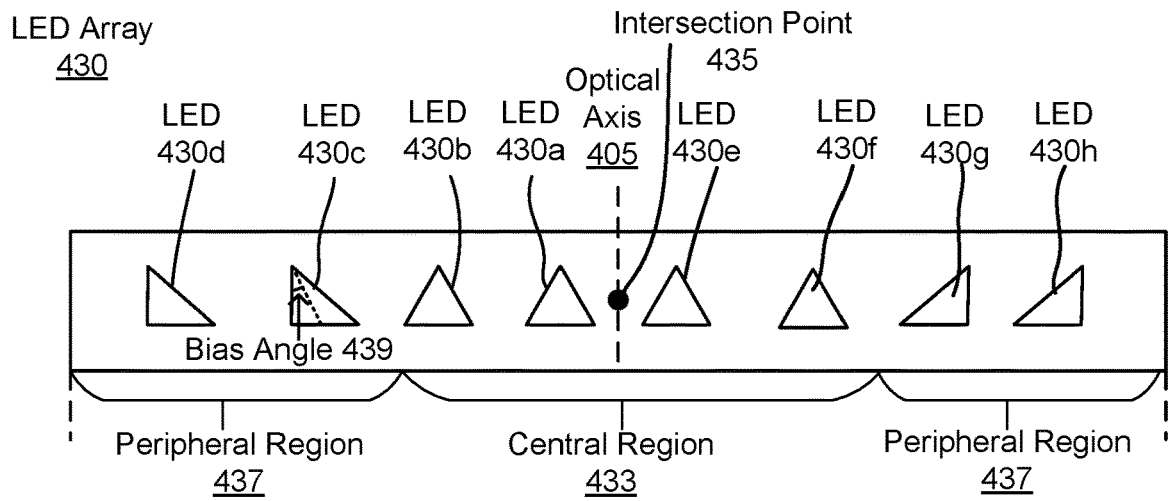
FIG. 4C shows another array of LEDs, in which at least some of the LEDs have different orientations, in accordance with one or more embodiments.

FIG. 4C shows another array 430 of LEDs 430a-h, in which at least some of the LEDs 430a-h have different orientations, in accordance with one or more embodiments. In the embodiment of FIG. 4C, the LED array 310 includes a center region 433 and a peripheral region 437. The central region 433 is circumscribed by the peripheral region 437. The LEDs 430a, 430b, 430e, and 430f are in the central region 433 and their bias angle is zero. The LEDs 430c, 430d, 430g, and 430h are in the peripheral region 437 and have a same bias angle 439. Due to the different orientations of some of the LEDs 430, light emitted by the array 430 has a non-uniform distribution. Also, at least some of the LEDs 430a-h may emit light having different levels of brightness.

Figure 5A:
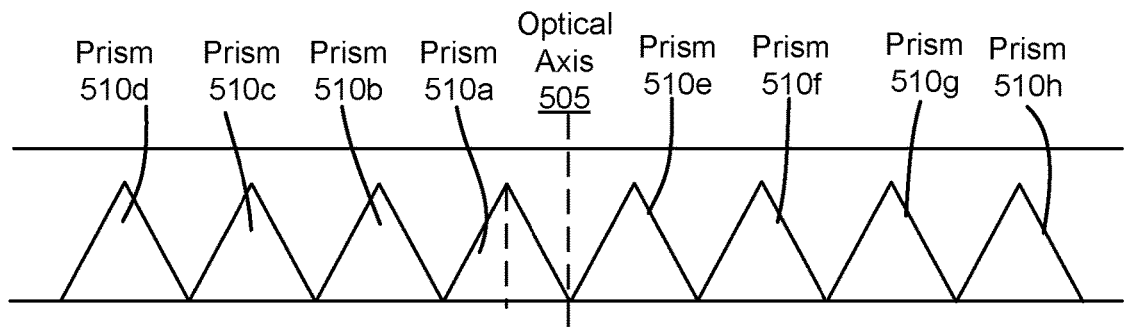
FIG. 5A shows a brightness enhancement film that includes a plurality of unbiased prisms, in accordance with one or more embodiments.

FIG. 5A shows a brightness enhancement film 510 that includes a plurality of unbiased prisms 510a-h, in accordance with one or more embodiments. The brightness enhancement film 510 is an embodiment of the brightness enhancement film 330 in FIG. 3. For purpose of illustration, FIG. 5A shows a row of eight prisms. The brightness enhancement films 510 can include a different number of prisms that are arranged in multiple rows. In FIG. 5A, the eight prisms 510a-h have the same orientation and are not biased. Each prism is parallel to an optical axis 505. In some embodiments, the optical axis 505 is the same as the optical axis 405 in FIGS. 4A-4C.

Figure 5B:
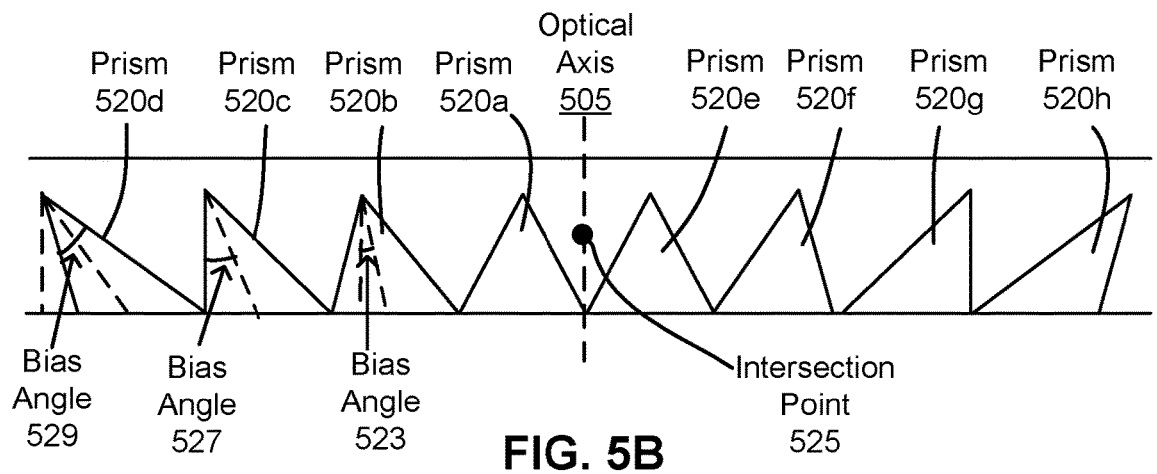
FIG. 5B shows a brightness enhancement film that includes a plurality of prisms, some of which are biased, in accordance with one or more embodiments.

FIG. 5B shows a brightness enhancement film 520 that includes a plurality of prisms 520a-h, some of which are biased, in accordance with one or more embodiments. In FIG. 5B, the eight prisms 520a-h have different bias angles, which increase with distance from an on-axis intersection point 525. The intersection point 525 is a point on the optical axis 505 where the optical axis 505 intersects with the brightness enhancement film 520. In some embodiments, prisms 520 of locations having the same distance from the interaction point 525 have the same bias angle. As shown in FIG. 5B, the bias angles of the prisms 520a and 520e are both zero. The prisms 520c and 520g have the same bias angle 527, which is larger than the bias angle 523 of the prisms 520b and 520f but smaller than the bias angle 529 of the prisms 520d and 520h.

Figure 5C:
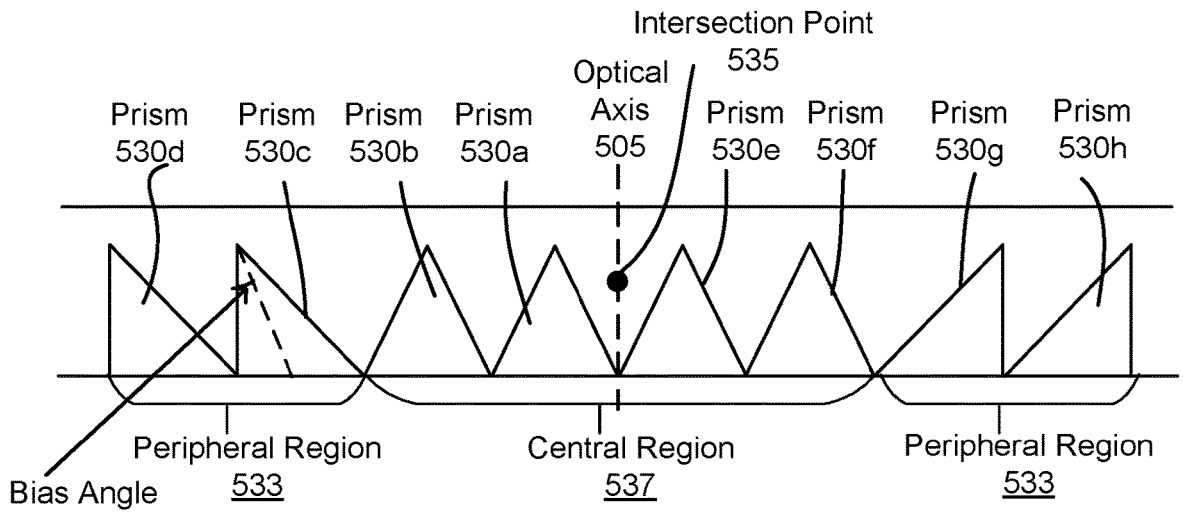
FIG. 5C shows another brightness enhancement film that includes a plurality of prisms, some of which are biased, in accordance with one or more embodiments.

FIG. 5C shows another brightness enhancement film 530 that includes a plurality of prisms 530a-h, some of which are biased, in accordance with one or more embodiments. The brightness enhancement film 530 includes a peripheral region 533 and a center region 537 that is circumscribed by the peripheral region 533. The prisms 530a, 530b, 530e, and 530f are in the central region 537 and their bias angle is zero. The prisms 530c, 530d, 530g, and 530h are in the peripheral region 533 and have a same bias angle 539. Prisms of different bias angles reflect light differently and therefore recycles different amounts of light, causing variation in brightness of the light.

Figure 6:
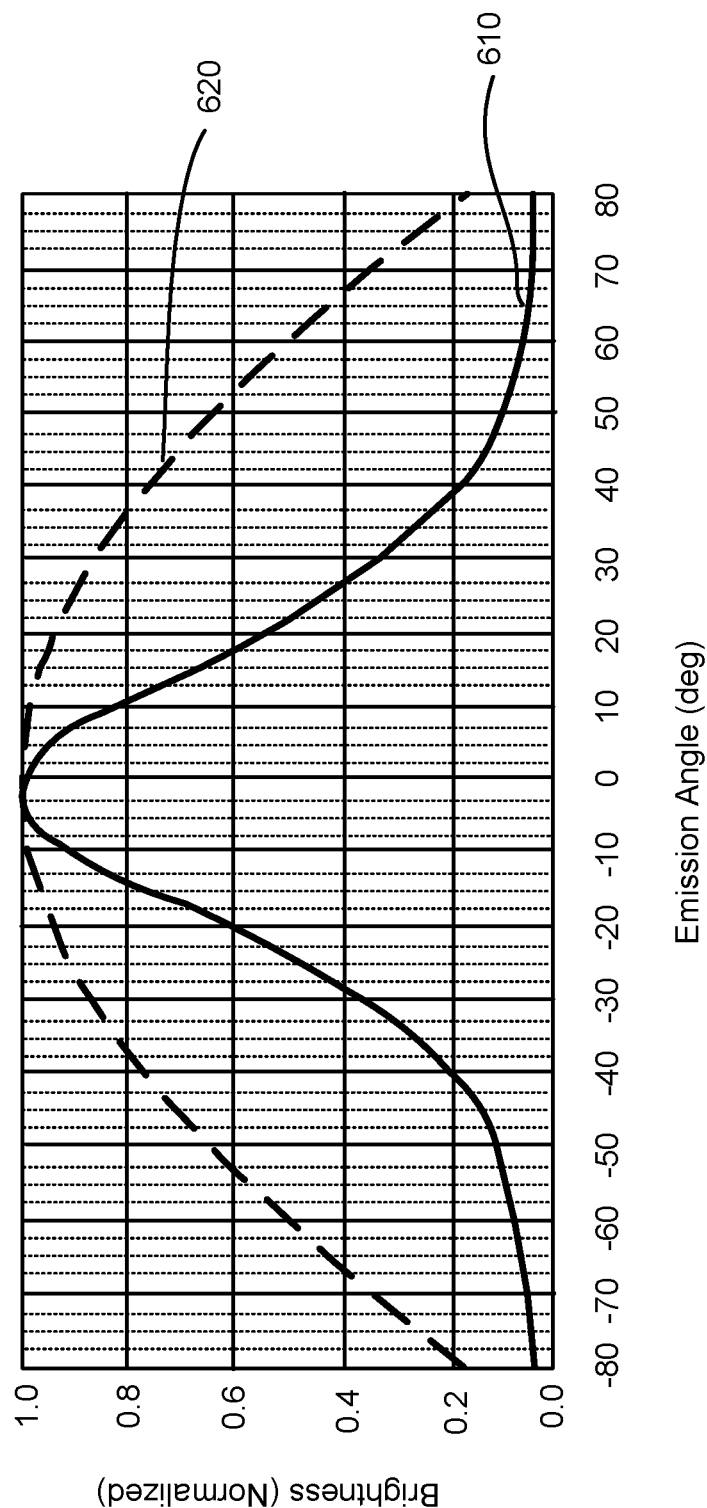
FIG. 6 illustrates nonuniform brightness distribution of image light caused by a display panel, in accordance with one or more embodiments.

FIG. 6 illustrates non-uniform brightness distribution of image light caused by a display panel, in accordance with one or more embodiments. The display panel can be the display panel 220 in FIG. 2. In the embodiment of FIG. 6, the display panel is a liquid crystal display that is backlit with light having a uniform brightness distribution. FIG. 6 includes two curves 610 and 620. The curve 610 represents brightness of image light generated by the display panel 220 as a function of emission angle. The curve 620 represents brightness of Lambertian emission as a function of emission angle, which is a target brightness distribution. An emission angle is an angle between the direction of the image light and a direction perpendicular to the display panel 220. The brightness in the two curves 610 and 620 is normalized, where the highest brightness is 1.0 and no light is 0.0. Compared with the curve 620, the curve 610 has sharper fall off. For example, at an emission angle of 40 degrees, the brightness on the curve 610 is 0.2 but the brightness on the curve 620 is approximately 0.78. That means, when the user views from an angle of 40 degrees, the user sees a significantly darker image than when the user looks straight at the display panel 220. Therefore, the errors caused by the display panel impair the user's viewing experience. The errors can be corrected when the display panel is backlit with light having non-uniform brightness distribution. Various embodiments of the backlight assembly described above generates such light having non-uniform and therefore, helps to improve the user's viewing experience.

Figure 7A:
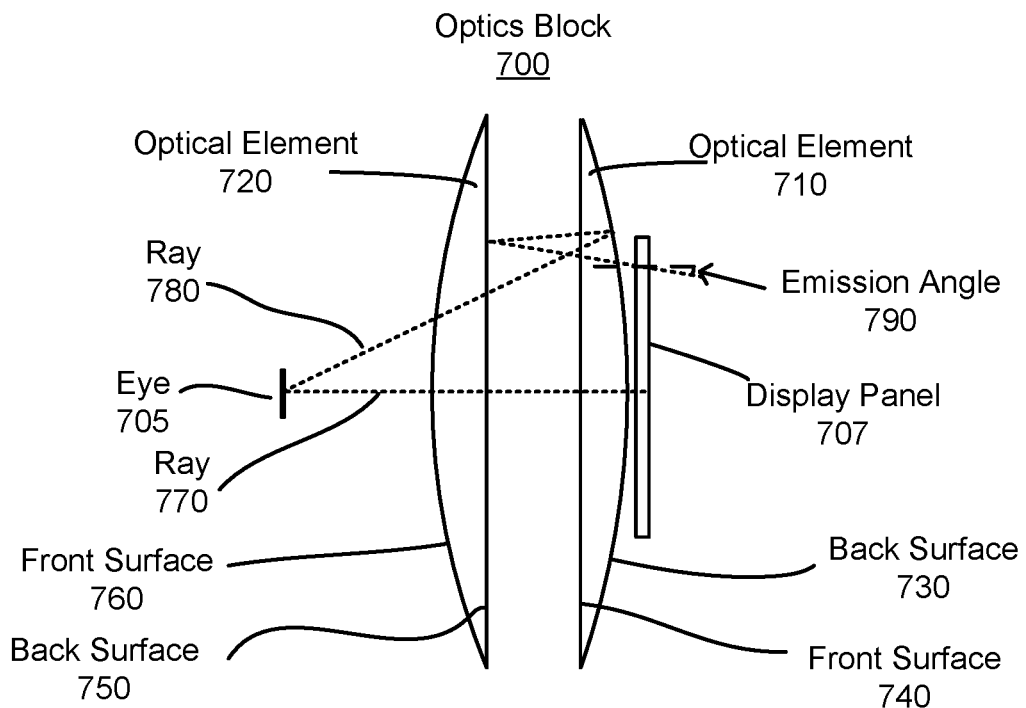
FIG. 7A illustrates nonuniform brightness distribution of image light caused by an optics block when an eye of a user gazes forward, in accordance with one or more embodiments.

FIG. 7A illustrates non-uniform brightness distribution of image light caused by an optics block 700 when an eye 705 of a user gazes forward, in accordance with one or more embodiments, in accordance with one or more embodiments. The optics block 700 is configured to direct image light generated by a display panel 707 into an eyebox where an eye 705 is located. The optics block 700 can be an embodiment of the optics block 230 in FIG. 2. The display panel 707 can be an embodiment of the display panel 220 in FIG. 2.

As shown in FIG. 7A, the optics block 700 includes two optical elements 710 and 720. The optical elements 710 and 720 together form a folded optical system. In some embodiments, the folded optical system is a pancake lens assembly. Note that one or both of the optical elements 710 and 720 may impart optical power to the image light (e.g., have curved front and/or back surfaces). For example, in one embodiment of a pancake lens assembly, the optical element 710 includes a back surface 730 coated with a partial reflector (e.g., 50:50 reflector), and a front surface 740 coated with a quarter waveplate. And the optical element 720 includes a back surface 750 coated with a reflective linear polarizer and a front surface 760 coated with a quarter waveplate. In some embodiments, the back surface 730 may also have a linear polarizer coated on top of the partial reflector. In some embodiments, the optics block 700 includes more than two optical elements forming a folded optical system. For example, the optics block 700 may include four optical elements forming a folded optical system. Additional details and implementations of pancake lens assemblies may be found at, e.g., U.S. patent application Ser. No. 15/441,738, U.S. patent application Ser. Nos. 15/335,807, and 15/179,883 which are hereby incorporated by reference in their entirety. Embodiments of the optics block 230 are not limited to the examples discussed herein.

Angles of rays from the display panel 707 to the eye 705 depend on the design of the optical surfaces 730-760. In FIG. 7A, the eye 705 gazes forward. For a ray 770 emitted from the center of the display panel 707, the ray 770 is perpendicular to the display panel 707 so the emission angle of the ray 770 on the display is zero. But for a ray 780 emitted from a peripheral region of the display panel 707, the ray 780 is reflected by the optical surfaces 730 and 750 before the ray arrives at the eye 250. Due to the reflection by the optical surfaces 730 and 750, the emission angle 790 of the ray is a. In some embodiments, a is 7 degrees. According to the curve 610 in FIG. 6, the brightness of the ray 770 is 1.0 but the brightness of the ray 780 is approximately 0.87. Therefore, from the perspective of the eye 705, there is a drop in brightness form the center of the display panel 707 to the peripheral region of the display panel 230. The drop can be more significant when the eye 250 changes the gaze direction, e.g., by rotating. The non-uniform brightness distributions caused by the optics block 700 can be offset by non-uniform brightness distribution generated by a backlight assembly (e.g., the backlight assembly 300 in FIG. 3) so that the image light arrived at the eye 705 has more evenly distributed brightness.

Figure 7B:
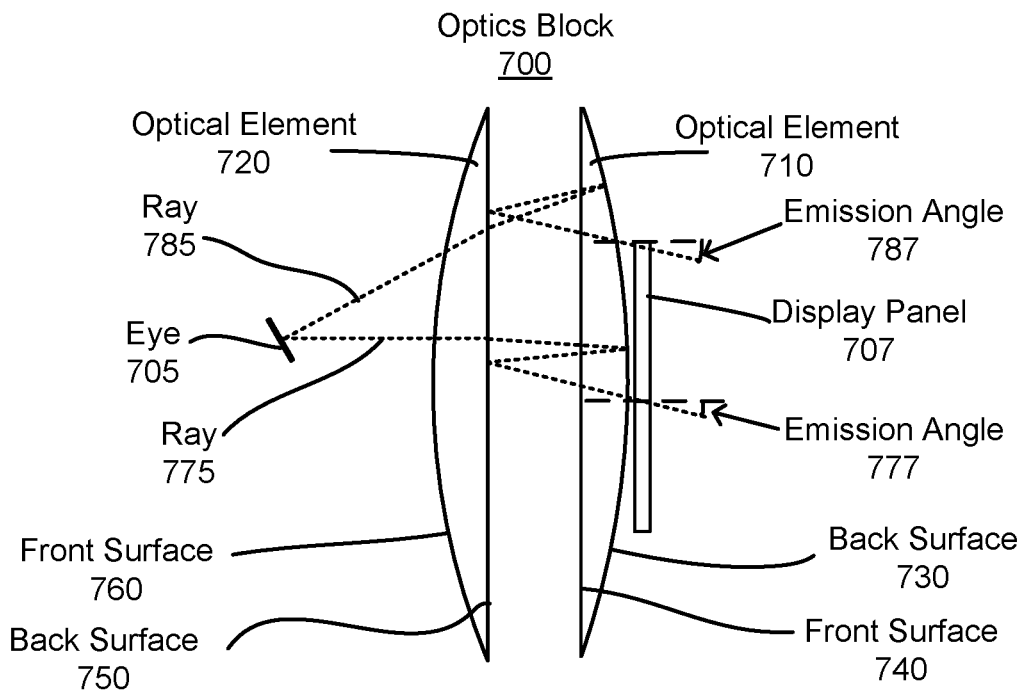
FIG. 7B illustrates nonuniform brightness distribution of image light caused by the optics block when the eye gazes at a different direction, in accordance with one or more embodiments.

FIG. 7B illustrates non-uniform brightness distribution of image light caused by the optics block 700 when the eye 705 gazes at a different direction, in accordance with one or more embodiments. In FIG. 7B, the eye 705 has a different gaze direction from FIG. 7A. A ray 775 from the center of the display panel 707 is reflected by the optical surfaces 730-760 and has an emission angle 777 of 11.8 degrees. A ray 785 from the peripheral region of the display panel 230 has an emission angle 787, β. β is larger than α. In some embodiments, β is 21.1 degrees. According to the curve 610 in FIG. 6, the brightness of the ray 775 is approximately 0.85 but the brightness of the ray 785 is approximately 0.60. Gaze directions of the eye 705 can be detected by an eye tracking system, e.g., the eye tracking system 260 in FIG. 2. A controller or console that is associated with the eye tracking system can control the backlight assembly and dynamically adjust the non-uniform brightness distribution generated by the backlight assembly based on the detected gaze directions of the eye 705. For example, the controller or console can adjust brightness of at least some LEDs in the backlight assembly based on the detected gaze directions.

Figure 8A:
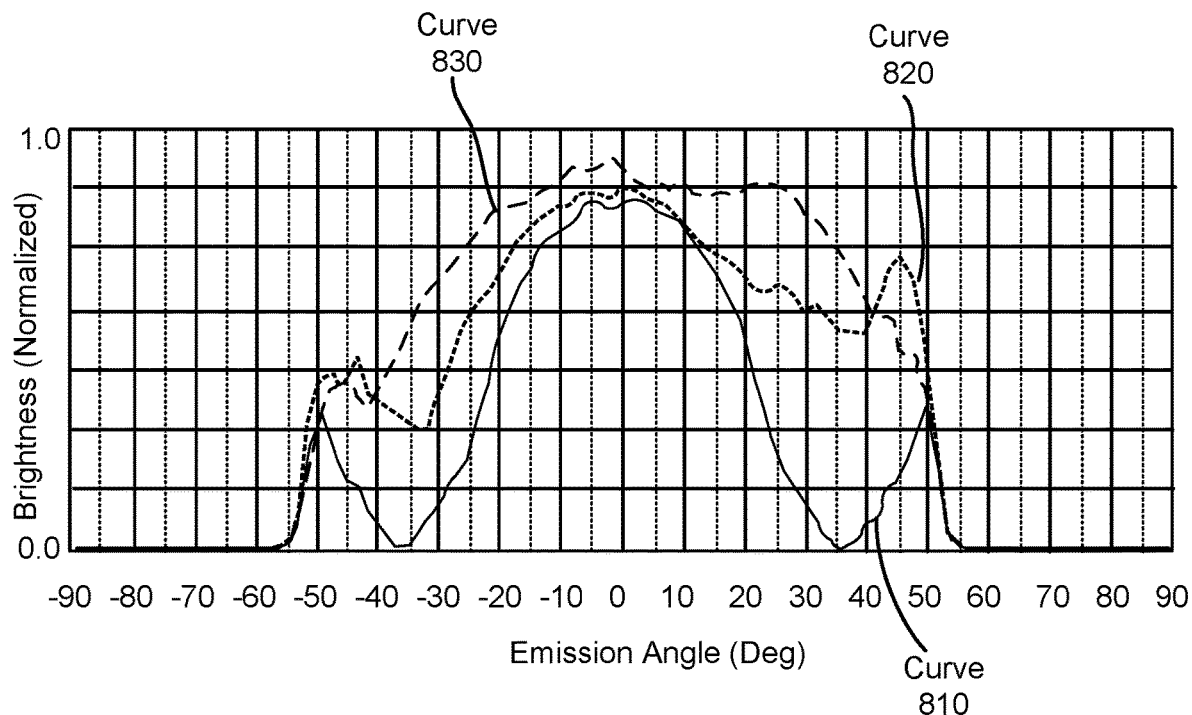
FIG. 8A shows brightness distribution of image light corrected by backlight assemblies that include LEDs having unbiased orientation, in accordance with one or more embodiments.

FIG. 8A shows brightness distribution of image light corrected by backlight assemblies that include LEDs having unbiased orientation, in accordance with one or more embodiments. Each of the backlight assemblies includes an LED arrays and a brightness enhancement film. The backlight assembly can be an embodiment of the backlight assembly 210 in FIG. 2. In the embodiments of FIG. 8A, the LEDs in each of the backlight assemblies are not biased but the LEDs in the peripheral region of the LED array have higher brightness than the LEDs in the central region of the LED array. FIG. 8A includes three curves 810-830 representing brightness of image light as a function of emission angle. Each curve corresponds to a backlight assembly, the brightness enhancement film of which has a different configuration. For each curve, the brightness enhancement film of the backlight assembly has a different bias angle. In the embodiment of the curve 810, the brightness enhancement film is not biased. The curve 810 has a sharp drop between 0 and 35 degrees. But because the LEDs in the peripheral region of the LED array have higher brightness, there is an increase in brightness between 35 and 55 degrees. In the embodiment of the curve 820, the brightness enhancement film has a bias angle of 15 degrees. The curve 820 has a small drop between 0 and 50 degrees, indicating the brightness varies less with emission angle. The brightness distribution of the image light is improved by the backlight assembly having a biased brightness enhancement film in the embodiment of the curve 820, compared with the embodiment of the curve 820. In the embodiment of the curve 830, the brightness enhancement film has a bias angle of 30 degrees. Compared with the curve 820, the curve 830 has even less drop between 0 and 50 degrees, especially between 0 and 40 degrees. The higher bias angle of the brightness enhancement film 320 further improves the brightness distribution of the image light.

Figure 8B:
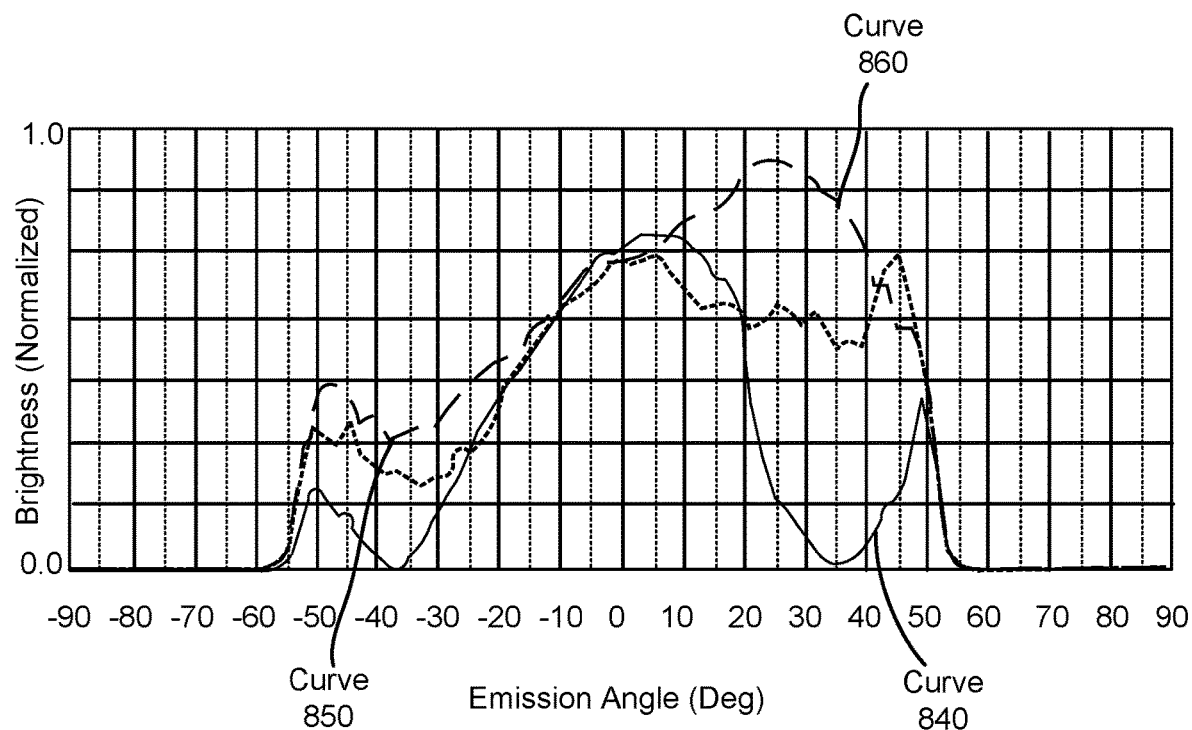
FIG. 8B shows brightness distribution of image light corrected by backlight assemblies that include LEDs having biased orientations, in accordance with one or more embodiments.

FIG. 8B shows brightness distribution of image light corrected by backlight assemblies that include LEDs having biased orientations, in accordance with one or more embodiments. Each of the backlight assemblies of FIG. 8B includes an LED array and a brightness enhancement film. The backlight assembly can be an embodiment of the backlight assembly 210 in FIG. 2. In the embodiments of FIG. 8B, the LEDs in the backlight assemblies have a bias angle of 30 degrees. Also, the LEDs in the peripheral region of the LED array have higher brightness than the LEDs in the central region of the LED array. FIG. 8B includes three curves 840-860, each of which correspond to a backlight assembly, the brightness enhancement film of which has a different configuration. In the embodiment of the curve 840, the brightness enhancement film is not biased. The curve 840 is similar to the curve 810 but shows slightly better brightness distribution. The fall off between negative 35 degrees and 0 degree is not as sharp and the brightness between 40 and 55 degrees are higher. In the embodiment of the curve 850, the brightness enhancement film 320 has a bias angle of 15 degrees. The curve 820 has minor drop between 0 and 50 degrees, showing a significantly improved brightness distribution than the curve 840. In the embodiment of the curve 860, the brightness enhancement film 320 has a bias angle of 30 degrees. Compared with the curve 850, the curve 860 shows higher brightness.

System Environment

Figure 9:
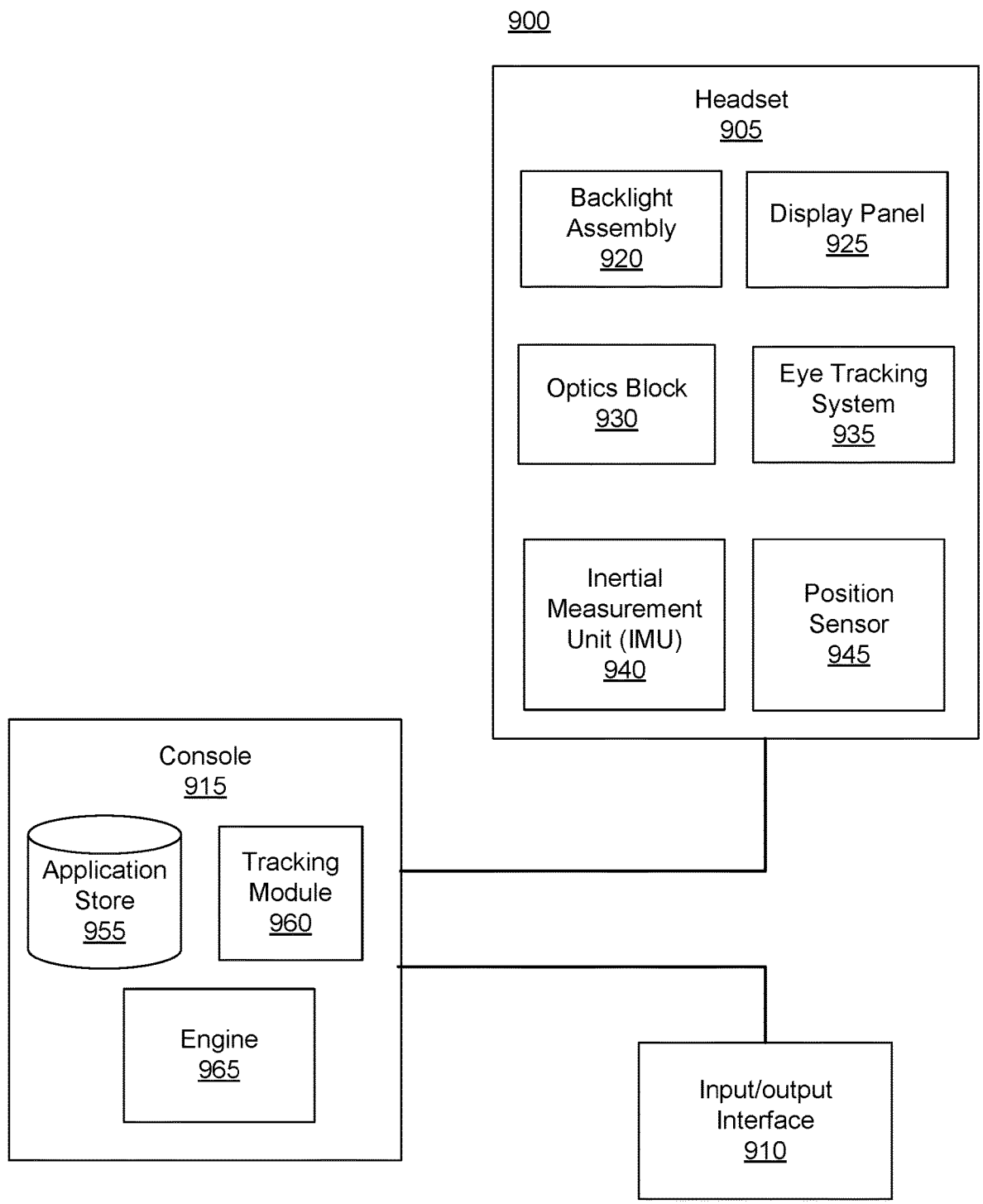
FIG. 9 is a block diagram of an artificial reality system, in accordance with one or more embodiments.

FIG. 9 is a block diagram of one embodiment of an artificial reality system 900 in accordance with one or more embodiments. The artificial reality system 900 may operate in an artificial reality system environment. In some embodiments, the artificial reality system 900 shown by FIG. 9 comprises a headset 905 and an input/output (I/O) interface 910 that is coupled to a console 915. While FIG. 9 shows an example artificial reality system 900 including one headset 905 and one I/O interface 910, in other embodiments any number of these components may be included in the artificial reality system 900. For example, there may be multiple headsets 905 each having an associated I/O interface 910, with each headset 905 and I/O interface 910 communicating with the console 915. In alternative configurations, different and/or additional components may be included in the artificial reality system 900. Additionally, functionality described in conjunction with one or more of the components shown in FIG. 9 may be distributed among the components in a different manner than described in conjunction with FIG. 9 in some embodiments. For example, some or all of the functionality of the console 915 is provided by the headset 905.

The headset 905 presents content to a user comprising virtual and/or augmented views of a physical, real-world environment with computer-generated elements (e.g., two-dimensional (2D) or three-dimensional (3D) images, 2D or 3D video, sound, etc.). The headset 905 may be, e.g., a HMD or a NED that includes a backlit display system (e.g., the backlit display system 205). In some embodiments, the presented content includes audio that is presented via an external device (e.g., speakers and/or headphones) that receives audio information from the headset 905, the console 915, or both, and presents audio data based on the audio information. The headset 905 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the headset 905 is the headset 100 described above in conjunction with FIG. 1.

The headset 905 includes a backlight assembly 920, a display panel 925, an optics block 930, an eye tracking system 935, an IMU 940, and one or more position sensors 945. Some embodiments of the headset 905 have different components than those described in conjunction with FIG. 9. Additionally, the functionality provided by various components described in conjunction with FIG. 9 may be differently distributed among the components of the headset 905 in other embodiments.

The backlight assembly 920 provide light for the display panel 925. The backlight assembly 920 includes an array of LEDs that emit light, a diffusing element configured to diffuse the emitted light, and at least one brightness enhancement film to direct some of the diffused light towards the display panel 925 to recycle the otherwise wasted diffused light. In various embodiments, the light includes a non-uniform brightness distribution resulted from various configurations of the LEDs and/or the brightness enhancement film. For example, at least some of the LEDs can emit light having different levels. Also, at least some of the LEDs can be biased to emit light in different directions. As another example, the brightness enhancement film is biased. An embodiment of the backlight assembly 920 is the backlight assembly 210 in FIG. 2. The non-uniform brightness distribution of the light can be offset by another non-uniform brightness distribution added by the display panel 925 and/or the optics block 930 so that a target brightness distribution is generated.

The display panel 925 converts the light to image light and displays 2D or 3D images to the user in accordance with data received from the console 915. In various embodiments, the display panel 925 comprises a single electronic display or multiple electronic displays (e.g., a display for each eye of a user). Examples of the display panel 925 include: a liquid crystal display, an OLED display, an ILED display, an AMOLED display, a TOLED display, some other display, or some combination thereof. The display panel 925 may be an embodiment of the display panel 220 in FIG. 2.

The optics block 930 magnifies image light received from the display panel 925, corrects optical errors associated with the image light, and presents the corrected image light to a user of the headset 905. Magnification and focusing of the image light by the optics block 930 allows the display panel 925 to be physically smaller, weigh less and consume less power than larger displays. Additionally, magnification may increase the field-of-view of the content presented by the display panel 925. For example, the field-of-view of the displayed content is such that the displayed content is presented using almost all (e.g., approximately 110 degrees diagonal), and in some cases all, of the user's field-of-view. Additionally in some embodiments, the amount of magnification may be adjusted by adding or removing optical elements.

In some embodiments, the optics block 930 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the display panel 925 for display is pre-distorted, and the optics block 930 corrects the distortion when it receives image light from the display panel 925 generated based on the content. The optics block 930 may be an embodiment of the optics block 230 in FIG. 2.

The eye tracking system 935 tracks the user's eye. For example, the eye tracking system 935 projects structured light to the eye and collect structured light reflected back from the eye to determine a position and/or orientation of the eye. The eye tracking system 935 can detect gaze directions of the eye. The detected gaze directions can be used, e.g., by the console 915, to determine configuration of the backlight assembly 920. For example, brightness of the LEDs can be adjusted based on the gaze direction so that the non-uniform brightness distribution of the light is adjusted based on the gaze direction.

The IMU 940 is an electronic device that generates data indicating a position of the headset 905 based on measurement signals received from one or more of the position sensors 945. A position sensor 945 generates one or more measurement signals in response to motion of the headset 905. Examples of position sensors 945 include: one or more accelerometers, one or more gyroscopes, one or more magnetometers, another suitable type of sensor that detects motion, a type of sensor used for error correction of the IMU 940, or some combination thereof. The position sensors 945 may be located external to the IMU 940, internal to the IMU 940, or some combination thereof.

Based on the one or more measurement signals from one or more position sensors 945, the IMU 940 generates data indicating an estimated current position of the headset 905 relative to an initial position of the headset 905. For example, the position sensors 945 include multiple accelerometers to measure translational motion (forward/back, up/down, left/right) and multiple gyroscopes to measure rotational motion (e.g., pitch, yaw, roll). In some embodiments, the IMU 940 rapidly samples the measurement signals and calculates the estimated current position of the headset 905 from the sampled data. For example, the IMU 940 integrates the measurement signals received from the accelerometers over time to estimate a velocity vector and integrates the velocity vector over time to determine an estimated current position of a reference point on the headset 905. Alternatively, the IMU 940 provides the sampled measurement signals to the console 915, which interprets the data to reduce error. The reference point is a point that may be used to describe the position of the headset 905. The reference point may generally be defined as a point in space or a position related to the HMD's 905 orientation and position.

The IMU 940 receives one or more parameters from the console 915. The one or more parameters are used to maintain tracking of the headset 905. Based on a received parameter, the IMU 940 may adjust one or more IMU parameters (e.g., sample rate). In some embodiments, certain parameters cause the IMU 940 to update an initial position of the reference point so it corresponds to a next position of the reference point. Updating the initial position of the reference point as the next calibrated position of the reference point helps reduce accumulated error associated with the current position estimated the IMU 940. The accumulated error, also referred to as drift error, causes the estimated position of the reference point to "drift" away from the actual position of the reference point over time. In some embodiments of the headset 905, the IMU 940 may be a dedicated hardware component. In other embodiments, the IMU 940 may be a software component implemented in one or more processors.

The I/O interface 910 is a device that allows a user to send action requests and receive responses from the console 915. An action request is a request to perform a particular action. For example, an action request may be an instruction to start or end capture of image or video data or an instruction to perform a particular action within an application. The I/O interface 910 may include one or more input devices. Example input devices include: a keyboard, a mouse, a game controller, or any other suitable device for receiving action requests and communicating the action requests to the console 915. An action request received by the I/O interface 910 is communicated to the console 915, which performs an action corresponding to the action request. In some embodiments, the I/O interface 910 includes an IMU 940 that captures calibration data indicating an estimated position of the I/O interface 910 relative to an initial position of the I/O interface 910. In some embodiments, the I/O interface 910 may provide haptic feedback to the user in accordance with instructions received from the console 915. For example, haptic feedback is provided when an action request is received, or the console 915 communicates instructions to the I/O interface 910 causing the I/O interface 910 to generate haptic feedback when the console 915 performs an action.

The console 915 provides content to the headset 905 for processing in accordance with information received from one or more of: the headset 905, and the I/O interface 910. In the example shown in FIG. 9, the console 915 includes an application store 955, a tracking module 960, and an engine 965. Some embodiments of the console 915 have different modules or components than those described in conjunction with FIG. 9. Similarly, the functions further described below may be distributed among components of the console 915 in a different manner than described in conjunction with FIG. 9.

The application store 955 stores one or more applications for execution by the console 915. An application is a group of instructions, that when executed by a processor, generates content for presentation to the user. Content generated by an application may be in response to inputs received from the user via movement of the headset 905 or the I/O interface 910. Examples of applications include: gaming applications, conferencing applications, video playback applications, or other suitable applications.

The tracking module 960 calibrates the artificial reality system 900 using one or more calibration parameters and may adjust one or more calibration parameters to reduce error in determination of the position of the headset 905 or of the I/O interface 910. Calibration performed by the tracking module 960 can account for information received from the IMU 940 in the headset 905 and/or an IMU 940 included in the I/O interface 910. Additionally, if tracking of the headset 905 is lost (e.g., the DCA 720 loses line of sight of at least a threshold number of structured light elements), the tracking module 960 may re-calibrate some or all of the artificial reality system 900.

The tracking module 960 tracks movements of the headset 905 or of the I/O interface 910 using information from the one or more position sensors 945, the IMU 940 or some combination thereof. For example, the tracking module 960 determines a position of a reference point of the headset 905 in a mapping of a local area based on information from the headset 905. The tracking module 960 may also determine positions of the reference point of the headset 905 or a reference point of the I/O interface 910 using data indicating a position of the headset 905 from the IMU 940 or using data indicating a position of the I/O interface 910 from an IMU 940 included in the I/O interface 910, respectively. Additionally, in some embodiments, the tracking module 960 may use portions of data indicating a position or the headset 905 from the IMU 940 to predict a future location of the headset 905. The tracking module 960 provides the estimated or predicted future position of the headset 905 or the I/O interface 910 to the engine 965.

The engine 965 executes applications within the artificial reality system 900 and receives position information, acceleration information, velocity information, predicted future positions, or some combination thereof, of the headset 905 from the tracking module 960. Based on the received information, the engine 965 determines content to provide to the headset 905 for presentation to the user. For example, if the received information indicates that the user has looked to the left, the engine 965 generates content for the headset 905 that mirrors the user's movement in a virtual environment or in an environment augmenting the local area with additional content. Additionally, the engine 965 performs an action within an application executing on the console 915 in response to an action request received from the I/O interface 910 and provides feedback to the user that the action was performed. The provided feedback may be visual or audible feedback via the headset 905 or haptic feedback via the I/O interface 910.

Additional Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A headset comprising:
a backlight assembly comprising an array of light emitting diodes (LEDs), the backlight assembly configured to generate light that has a brightness distribution composed of at least a first non-uniform brightness distribution;
a display panel configured to receive the light generated by the backlight assembly and convert the light to image light having at least the first non-uniform brightness distribution; and
an optics block including one or more optical elements configured to direct the image light to an eyebox, and the optics block adds a second non-uniform brightness distribution that is offset by the first non-uniform brightness distribution, such that the image light directed to the eyebox has a target brightness distribution.

2. The headset of claim 1, wherein some LEDs in the array of LEDs are configured to emit light of different levels of brightness, the different levels of brightness based in part on locations of LEDs in the LED array relative to an on-axis intersection point of the array of LEDs with an optical axis of the headset, wherein the first non-uniform brightness distribution is based in part on the light emitted from the array of LEDs.

3. The headset of claim 1, wherein the backlight assembly further comprises at least one brightness enhancement film, and the at least one brightness enhancement film includes a plurality of prisms and each of the plurality of prisms have a respective bias angle, and the respective bias angles increase as a function of distance from an on-axis intersection point at the at least one brightness enhancement film with an optical axis of the headset, wherein the first non-uniform brightness distribution is based in part on the respective bias angle of each prism of the plurality or prisms.

4. The headset of claim 1, wherein the backlight assembly further comprises at least one brightness enhancement film, and the at least one brightness enhancement film includes a plurality of prisms and the plurality of prisms includes a peripheral region and a center region, and each prism in the peripheral region has a larger respective bias angle than each prism in the center region, wherein the first non-uniform brightness distribution is based in part on the respective bias angle of each prism in the plurality of prisms.

5. The headset of claim 4, wherein bias angles of prisms in the peripheral region increase as a function of distance from an on-axis intersection point of the at least one or more brightness enhancement film with an optical axis of the headset.

6. The headset of claim 1, wherein the backlight assembly further comprises a first brightness enhancement film that has a first orientation and a second brightness enhancement film that has a second orientation, and the first orientation is orthogonal to the second orientation.

7. The headset of claim 1, wherein each LED in the array of LEDS has an orientation along a respective bias angle, and respective bias angles for each LED change as a function of distance from an on-axis intersection point of the array of LEDs with an optical axis of the headset, wherein the first non-uniform brightness distribution is based in part on the respective bias angle of each respective LED of the array of LEDs.

8. The headset of claim 1, wherein each LED in the array of LEDS has an orientation along a respective bias angle, and the array of LEDs includes a peripheral region and a center region, and each LED in the peripheral region has a larger respective bias angle than LEDs in the center region, wherein the first non-uniform brightness distribution is based in part on the respective bias angle of each respective LED of the array of LEDs.

9. The headset of claim 8, wherein bias angles of LEDs in the peripheral region increase as a function of distance from an on-axis intersection point of the array of LEDs with an optical axis of the headset.

10. The headset of claim 1, further comprising:
an eye tracking system configured to detect a gaze angle of an eye of a user; and a controller configured to adjust brightness of at least some LEDs in the array of LEDs based on the detected gaze angle.

11. The headset of claim 1, wherein the display panel adds a third non-uniform brightness distribution to the light, such that the image light from the display panel has a brightness distribution that includes both the first non-uniform brightness distribution and the third non-uniform brightness distribution, wherein third non-uniform brightness distribution is offset by the first non-uniform brightness distribution.

12. The headset of claim 1, wherein the first non-uniform brightness distribution is based in part on a variation in brightness of light emitted from the array of LEDs and at least one brightness enhancing film that receives the light from the array of LEDs.

13. A backlight assembly configured to generate light that has a brightness distribution composed of at least a first non-uniform brightness distribution and is used to backlight a display panel, wherein the display panel is configured to convert the light to image light, an optics block including one or more optical elements is configured to direct the image light to an eyebox, and the optics block adds a second non-uniform brightness distribution that is offset by the first non-uniform brightness distribution, such that the image light directed to the eyebox has a target brightness distribution.

14. The backlight assembly of claim 13, comprising:
an array of light emitting diodes (LEDs), wherein some LEDs in the array of LEDs are configured to emit light of different levels of brightness, the different levels of brightness based in part on locations of LEDs in the LED array relative to an on-axis intersection point of the array of LEDs with an optical axis of the optical block, wherein the first non-uniform brightness distribution is based in part on the light emitted from the array of LEDs.

15. The backlight assembly of claim 13, comprising:
at least one brightness enhancement film that includes a plurality of prisms and each of the plurality of prisms have a respective bias angle, and the respective bias angles increase as a function of distance from an on-axis intersection point at the at least one brightness enhancement film with an optical axis of the optical block, wherein the first non-uniform brightness distribution is based in part on the respective bias angle of each prism of the plurality or prisms.

16. The backlight assembly of claim 13, comprising:
at least one brightness enhancement film that includes a plurality of prisms and the plurality of prisms includes a peripheral region and a center region, and each prism in the peripheral region has a larger respective bias angle than each prism in the center region, wherein the first non-uniform brightness distribution is based in part on the respective bias angle of each prism in the plurality of prisms.

17. The backlight assembly of claim 13, comprising:
an array of light emitting diodes (LEDs), wherein each LED in the array of LEDs has an orientation along a respective bias angle, and respective bias angles for each LED change as a function of distance from an on-axis intersection point of the array of LEDs with an optical axis of the optical block, wherein the first non-uniform brightness distribution is based in part on the respective bias angle of each respective LED of the array of LEDs.

18. The backlight assembly of claim 13, comprising:
an array of light emitting diodes (LEDs), wherein each LED in the array of LEDs has an orientation along a respective bias angle, and the array of LEDs includes a peripheral region and a center region, and each LED in the peripheral region has a larger respective bias angle than LEDs in the center region, wherein the first non-uniform brightness distribution is based in part on the respective bias angle of each respective LED of the array of LEDs.

19. The backlight assembly of claim 13, comprising a first brightness enhancement film that has a first orientation and a second brightness enhancement film that has a second orientation, wherein the first orientation is orthogonal to the second orientation.

20. The backlight assembly of claim 13, comprising:
an array of light emitting diodes (LEDs), wherein brightness of at least some LEDs in the array of LEDs is adjusted based on a gaze angle of an eye of a user, the gaze angle detected by an eye tracking system.

* * * * *